United States Patent Office

3,403,131
Patented Sept. 24, 1968

3,403,131
EPOXIDE RESIN - ACID ANHYDRIDE COMPOSITIONS CONTAINING A HYDROXYALKYLATED AROMATIC AMINE ACCELERATOR
Edward William Garnish, Saffron Walden, England, assignor to Ciba Limited, Basel, Switzerland, a Swiss company
No Drawing. Filed Nov. 15, 1966, Ser. No. 594,373
Claims priority, application Great Britain, Dec. 2, 1965, 51,278/65
9 Claims. (Cl. 260—47)

This invention relates to the hardening of epoxide resins and, more particularly, to hardenable epoxide resin compositions containing accelerators for the hardening thereof.

It is known that epoxide resins, i.e. substances containing on average more than one 1,2-epoxide group per molecule, may be hardened or cured in admixture with polycarboxylic acid anhydrides to form tough, infusible solids having valuable technical properties. To effect this conversion it is generally necessary to maintain the mixture at a high temperature for a considerable period and, to bring about a reduction in this curing time, accelerators for the hardening have been incorporated in the epoxide resin-polycarboxylic acid anhydride mixtures. Accelerators which have been used include tertiary amines such as N-benzyldimethylamine or 2,4,6-tris(dimethylaminomethyl)phenol; salts of tertiary amines, such as the tris(2-ethylhexanoate) of 2,4,6-tris(dimethylaminomethyl)phenol; and complexes of tertiary amines or quaternary ammonium hydroxides with phenols.

These accelerators generally have a pronounced effect upon the rate of reaction between the epoxide resin and the polycarboxylic acid anhydride, and the extent of this effect may be adjusted by varying the amount of accelerator used. Although it is often desirable to obtain a rapid curing action, in some circumstances, e.g. in certain impregnation processes, only a moderate degree of acceleration is required, and it is then necessary to use very low concentrations of the conventional accelerators. It is, however, sometimes difficult to measure sufficiently accurately the requisite small amount of accelerator, and the uniform dispersion of very small proportions of accelerator in the hardenable mixture so as to avoid batch-to-batch variation in the pot-lives requires special techniques and great care. Further, where impurities which may influence the rate of the curing action are liable to be introduced, such as when fillers are used, there is a greater chance of the accelerating effect being modified in an unexpected manner.

It has now been found that certain adducts of aromatic amines with alkylene oxides may be used to accelerate the curing of epoxide resins with polycarboxylic acid anhydrides. By selection of the appropriate amine and/or alkylene oxide, and by choice of the number of alkylene oxide residues incorporated in such adducts, the degree of acceleration effected per unit weight of accelerator can be varied within wide limits. Particularly when adducts derived from aromatic monoprimary amines are used, a moderate degree of acceleration is readily achieved.

The present invention provides hardenable compositions comprising an epoxide resin, a polycarboxylic acid anhydride as hardener therefor, and, as accelerator for the hardening action, a compound containing, directly attached to an aromatic nucleus, at least one residue of the general formula:

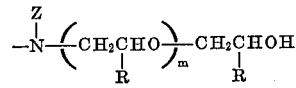

I wherein each R denotes a hydrogen atom or a methyl group, $m$ denotes an integer of value zero or more, and Z denotes a hydrogen atom, an alkyl group, or a grouping of the formula:

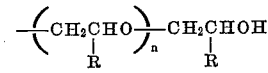

wherein $n$ denotes an integer of value zero or more, not more than two such residues of Formula I being attached to any one aromatic nucleus. Hardened products obtained by curing the aforesaid hardenable compositions are also within the scope of the invention.

Preferred accelerators are the compounds of the formula:

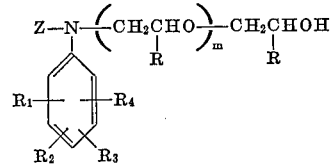

II wherein R, $m$ and Z have the meanings previously assigned and $R_1$, $R_2$, and $R_3$ and $R_4$ each denote a hydrogen or chlorine atom, or an alkyl or alkoxy group.

Other preferred accelerators are the compounds of the formula:

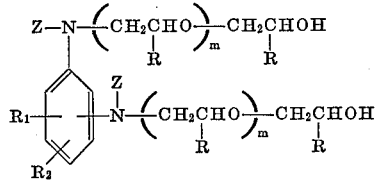

III wherein R, $m$, Z, $R_1$ and $R_2$ have the meanings previously assigned.

Also preferred as accelerators are the compounds of formula:

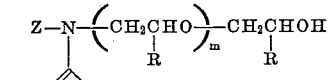

IV wherein R, $m$, Z, $R_1$ and $R_2$ have the meanings previously assigned and X represents a carbon-carbon bond, or a divalent group of the formula:

—CH$_2$—, —CO—, —S—, or —SO$_2$—

Yet other preferred accelerators are the compounds of the formula:

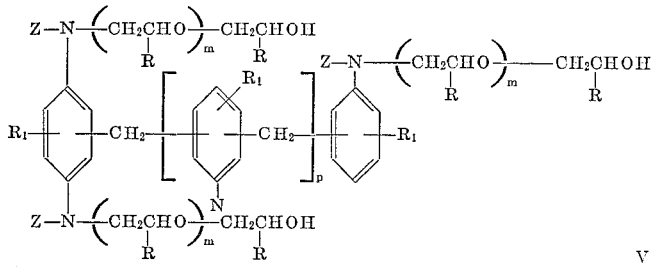

wherein $p$ is an integer of value at least 1, and wherein R, $m$, Z and R$_1$ have the meanings previously assigned.

More preferred accelerators are compounds of the formulae above given, wherein the sum of the integers denoted by $m$ and $n$ does not exceed 8.

Particularly preferred accelerators are the compounds of the formula:

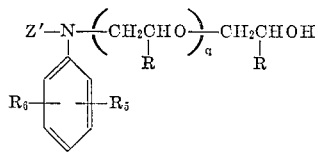

VI wherein R has the meaning previously assigned, R$_5$ and R$_6$ each denote a hydrogen atom, or an alkyl or alkoxy group containing up to two carbon atoms each, and Z' denotes either an alkyl group containing up to two carbon atoms, in which case $q$ is an integer of value from zero to 8, or a group of formula:

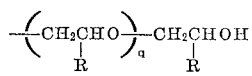

in which case $q$ is an integer of value from zero to 4.

The most preferred accelerators are compounds of formula:

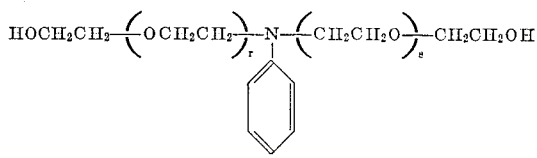

where $r$ and $s$ are each an integer of value zero or 1.

The aforesaid accelerators may be prepared by reaction of ethylene oxide and/or propylene oxide with an aromatic primary or secondary mono- or polyamine at elevated temperatures. To obtain adducts having a relatively high content of alkylene oxide residues, it is desirable to conduct the reaction in the presence of a catalyst such as an alkali metal. Aromatic primary monoamines that may be used include aniline, o-, m-, and p-toluidine, the xylylidines, o-ethylaniline and anisidine. There may also be used di-nuclear aromatic primary amines, such as 4,4'-aminodiphenylmethane, and also polyamines containing more than two aromatic nuclei, such as are obtainable by the reaction under acid conditions of aniline with formaldehyde. Aromatic secondary amines such as N-methyl- and N-ethylaniline may also be used.

Epoxide resins which may be used in the compositions of the present invention include, for example, polyglycidyl esters obtainable by the reaction of a di- or polycarboxylic acid with epichlorohydrin or glycerol dichlorohydrin in the presence of an alkali. Such polyglycidyl esters may be derived from aliphatic dicarboxylic acids, e.g. oxalic acid, succinic acid, sebacic acid, or dimerised or trimerised linoleic acid, and from aromatic dicarboxylic acids such as phthalic acid, isophthalic acid, terephthalic acid, naphthalene - 2,6-dicarboxylic acid, diphenyl-2,2'-dicarboxylic acid and etheylene glycol bis (4 - carboxyphenyl ether). Specific such polyglycidyl esters are, for example, diglycidyl phthalate, diglycidyl adipate and the diglycidyl esters which correspond to the average formula:

$$CH_2\!\!-\!\!CH-CH_2-(OOC-A-COO-CH_2CHOH-CH_2-)_p-OOC-A-COO-CH_2-CH-CH_2$$
$$\diagdown\!\!O\!\!\diagup \qquad\qquad\qquad\qquad\qquad\qquad\qquad\qquad\qquad\qquad\qquad\qquad\qquad \diagdown\!\!O\!\!\diagup$$

V in which A represents a divalent aromatic hydrocarbon radical, such as a phenylene group, and $p$ represents a small whole or fractional number.

Other epoxide resins which may be used include polyglycidyl ethers, such as those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane - 1,2-diol, propane-1,3-diol, butane-1,4-diol, pentane-1,5-diol, hexane-1,6-diol, hexane-2,4,6-triol, glycerol or N-aryldialkanolamines such as N-phenyldiethanolamine, or, preferably from dihydric or polyhydric phenols such as resorcinol, catechol, hydroquinone, 1,4-dihydroxynaphthalene, 1,5-dihydroxynaphthalene, bis(4-hydroxyphenyl)methane, bis(4 - hydroxyphenyl)methylphenylmethane, bis(4 - hydroxyphenyl)tolylmethanes, 4,4' - dihydroxydiphenyl, bis(4-hydroxyphenyl)sulphone and, especially 2,2 - bis(4-hydroxyphenyl)propane or phenol-formaldehyde condensation products.

There may further be employed aminopolyepoxides such as are, for example, obtained by dehydrohalogenation of the reaction products of epihalohydrins and primary or di-secondary amines such as aniline, n-butylamine, bis(4 - aminophenyl)methane or bis(4-methylaminophenyl)methane.

Epoxide resins obtained by the epoxidation of cyclic and acyclic polyolefins may also be employed, such as vinylcyclohexene dioxide, limonene dioxide, dicyclopentadiene dioxide, 3,4-epoxydihydrodicyclopentadienyl glycidyl ether, the bis(3,4 - epoxydihydrodicyclopentadienyl) ether of ethylene glycol, 3,4 - epoxycyclohexylmethyl 3',4' - epoxycyclohexanecarboxylate and its 6,6'-dimethyl derivative, the bis(3,4-epoxycyclohexanecarboxylate) of ethylene glycol, the acetal formed between 3,4 - epoxycyclohexanecarboxyaldehyde and 1,1 - bis(hydroxymethyl) - 3,4 - epoxycyclohexane, and epoxidised butadienes or copolymers of butadiene with ethylenic compounds such as styrene and vinyl acetate.

Especially suitable epoxide resins are those obtained by the reaction of 2,2-bis(4-hydroxyphenyl)propane (Bisphenol A) with epichlorohydrin in the presence of an alkali and having an epoxide content of about 2.0 to 5.88 epoxide equivalents per kilogram.

Polycarboxylic acid anhydrides which may be used as hardeners in the compositions of the present invention include, for example, phthalic anhydride, tetrahydrophthalic anhydride, methylendomethylenetetrahydrophthalic anhydride, hexachloroendomethylenetetrahydrophthalic anhydride, endomethylenetetrahydrophthalic anhydride, hexahydrophthalic anhydride, pyromellitic dianhydride, maleic anhydride, succinic anhydride, dodecenylsuccinic anhydride, polysebacic anhydride, and polyazelaic anhydride.

The compositions of the present invention may contain reactive diluents such as phenyl glycidyl ether, allyl glycidyl ether, glycidyl methacrylate, glycidyl acrylate or n-butyl glycidyl ether. They may also contain fillers, plasticisers, and colouring agents, for example, asphalt, bitumen, glass fibers, mica, quartz powder, cellulose, kaolin, finely-divided silica (such as that available under the registered trademark "Aerosil"), or metal powder.

The optimum proportions of the various ingredients of the compositions of the invention can readily be determined by routine experiment in manner known per se. However, by way of illustration, from about 0.4 to 1.2 anhydride group equivalents of the polycarboxylic acid anhydride per 1,2-epoxy equivalent of the 1,2-epoxide resin, and from about 1 to 10 parts by weight of the accelerator per 100 parts by weight of 1,2-epoxide resin, may be used.

The aforesaid compositions may be used as, for example, casting, potting, encapsulating, coating, lamination and adhesive resins.

The following examples illustrate the invention. The average molecular weights of the accelerators of the invention were determined in known manner by titrating samples of the adducts, dissolved in glacial acetic acid, with 0.1 N-perchloric acid in glacial acetic acid, crystal violet dissolved in glacial acetic acid being used as indicator.

Gel-times of the mixtures were determined by means of a "Techne" gelation timer. "Parts" denotes parts by weight.

EXAMPLE 1-6

The accelerators of the present invention used in these examples were prepared as follows:

(A) Ethylene oxide was passed into aniline (93 parts) heated at 175–185° C. until an increase in weight of 88 parts had occurred. On cooling, the product solidified to a pale cream wax, which was identified as practically pure N,N-bis(2-hydroxyethyl)aniline (molecular weight found was 182; theory is 181).

(B) To this product (100 parts), melted in an atmosphere of nitrogen, was added 0.3 part of sodium, and the mixture heated at 175–185° C. while ethylene oxide was passed in until an increase in weight of 43.5 parts had occurred. The product was cooled and filtered. An amber syrup was obtained, the average molecular weight of which was determined to be 259.

Ethylene oxide-aniline adducts having determined molecular weights of 159 (corresponding to a molar ratio of aniline to ethylene oxide of 1:1.5), 223, 294 and 400 (corresponding to a molar ratio of aniline to ethylene oxide of 1:6.98) were similarly prepared, the quantity of ethylene oxide added being appropriately raised in each case. The adducts were all liquid at room temperature except N,N-bis(2-hydroxyethyl)aniline.

The adducts described above were added to a mixture comprising 100 parts of an epoxide resin (hereinafter referred to as "Epoxide Resin I," having an epoxide content of 5.30 equiv./kg. and prepared in a conventional manner from Bisphenol A and epichlorohydrin) and 70 parts of hexahydrophthalic anhydride. The amounts used of the adducts, and the gel-times of the mixtures at 80° C., are shown in Table I.

TABLE I

| Example No. | Accelerator | | Gel time (minutes) |
|---|---|---|---|
| | Average mol. weight | Parts added | |
| 1 | 159 | 2.91 | 3,319 |
| 2 | 182 | 3.32 | 2,091 |
| 3 | 223 | 4.08 | 1,093 |
| 4 | 259 | 4.74 | 820 |
| 5 | 294 | 5.38 | 659 |
| 6 | 400 | 7.32 | 543 |
| | | None | >3,600 |
| | Aniline | 1.70 | >3,600 |

These results show that, in the absence of an added accelerator or if aniline were incorporated in the hardenable composition, gelation did not occur within 60 hours, whereas, in the presence of the accelerators of the present invention, gelation may be effected much more rapidly. Further, the time required for gelation may be varied within wide limits, using accelerators of different average molecular weight in different quantities, which however, contain identical amounts of nitrogen.

The gelled compositions of Examples 1–6 were fully cured on heating for a further 16 hours at 120° C.

EXAMPLES 7–11

Further accelerators of the present invention were obtained as follows:

N,N-bis(2-hydroxypropyl)aniline.—Propylene oxide was passed into aniline (93 parts) heated at 160° C. until an increase in weight of 116 parts had occurred. The product was a slightly viscous liquid at room temperature.

N,N-bis(2-hydroxypropoxyethyl)aniline.—N,N-bis(2-hydroxyethyl)aniline (136 parts) was melted and stirred with potassium hydroxide (2 parts) until the latter had dissolved. The mixture was then heated to 200–210° C. under nitrogen while propylene oxide was passed in over 3½ hours. An increase in weight of 77 parts occurred. The product was an amber syrup.

4,4'-bis(2-hydroxyethylamino)diphenylmethane.—4,4'-diaminodiphenylmethane (148.5 parts), admixed with 2 parts of ethylene glycol as addition initiator, was heated to 170–180° C. while ethylene oxide was passed in slowly. In the course of 7 hours, 66 parts of ethylene oxide were absorbed. The product was a very viscous liquid.

N-(2-hydroxyethyl)-N-methylaniline and N-ethyl-N-(2-hydroxyethyl)aniline.—These were used as supplied by Yorkshire Dyeware and Chemical Co. Ltd., Leeds, England.

Gel-times at 80° C. of mixtures containing these accelerators, 100 parts of epoxide resin I and 70 parts of hexahydrophthalic anhydride, are shown in Table II.

TABLE II

| Example No. | Accelerator name | Parts added | Gel time (minutes) |
|---|---|---|---|
| 7 | N-(2-hydroxyethyl)-N-methylaniline. | 2.78 | 149 |
| 8 | N-ethyl-N-(2-hydroxyethyl)aniline. | 3.02 | 483 |
| 9 | N,N-bis(2-hydroxypropyl)aniline | 3.90 | >2,661 |
| 10 | N,N-bis(2-hydroxypropoxyethyl)aniline. | 5.4 | 475 |
| 11 | 4,4'-bis(2-hydroxyethylamino)-diphenylmethane. | 5.75 | 1,075 |
| | N-benzyldimethylamine | 5 | 20 |
| | do | 1 | 47 |
| | do | 0.2 | 462 |

It will be seen from Examples 7–10, wherein accelerators containing substantially identical amounts of nitrogen are employed, that the time required for gelation may be varied within wide limits: in Example 11, a somewhat smaller proportion of accelerator has been used. For purposes of comparison, gel times with different amounts of a conventional accelerator, N-benzyldimethylamine, are given. The quantity of N-benzyldimethylamine containing the same amount of nitrogen as the proportions indicated for the accelerators in Examples 1–10 is about 2.48 parts. It will be seen that, in the case of the conventional accelerator, the proportion to be added to achieve a moderate degree of acceleration is so small as to be difficult to disperse uniformly.

EXAMPLES 12–15

These illustrate the use of accelerators of the present invention with other epoxide resins and anhydride curing agents. In Example 12, the resin component was 100 parts of a polyglycidyl ether of a phenolformaldehyde novolak resin, having an epoxide content of 5.4–5.8 equiv./kg. and a softening-point (as measured by the ball and ring method) within the range 35–48° C.; the hardener component comprised 78 parts by weight of hexahydrophthalic anhydride. In Examples 13 and 14, the resin component was 100 parts of epoxide resin I, while the hardener was methylbicyclo [2.2.1]heptene-2,3-dicarboxylic acid anhydride (82 parts). Table III shows the gel-times of the compositions.

TABLE III

| Example No. | Accelerator name | Parts | Gel time (minutes) |
|---|---|---|---|
| 12 | N,N-bis(2-hydroxyethyl) aniline | 5.38 | 347 |
| 13 | N-(2-hydroxyethyl)-N-methyl-aniline | 2.78 | 279 |
| 14 | N-ethyl-N-(2-hydroxyethyl) aniline | 3.02 | 1,096 |

What is claimed is:

1. A hardenable composition of matter comprising (1) an epoxide resin having a plurality of 1,2-epoxide groups, (2) a polycarboxylic acid anhydride as hardener therefor, and (3), as accelerator for the hardening action, a hydroxylated aromatic amine containing, directly attached to a benzene nucleus, at least one residue of the Formula I $$-\underset{\underset{Z}{|}}{N}-\left(CH_2\underset{\underset{R}{|}}{C}HO\right)_{m-1}-CH_2\underset{\underset{R}{|}}{C}HOH$$

wherein each R is a member selected from the group consisting of hydrogen atom and the methyl group, $m$ denotes an integer of at least 1, and Z is a member selected from the group consisting of hydrogen atom, alkyl group, and a radical of the formula $$-\left(CH_2\underset{\underset{R}{|}}{C}HO\right)_{n-1}-CH_2\underset{\underset{R}{|}}{C}HOH$$

wherein $n$ denotes an integer of at least one, with the proviso that at most two such residues of Formula I are attached to any one aromatic nucleus.

2. A composition according to claim 1, wherein the accelerator is of the formula $$Z-N\left(CH_2CHO\right)_{m-1}-CH_2CHOH$$ (with R substituents and a benzene ring bearing $R_1$, $R_2$, $R_3$, $R_4$)

wherein R, $m$ and Z are as defined in claim 1, and $R_1$, $R_2$, $R_3$ and $R_4$ each are members selected from the group consisting of hydrogen, chlorine atom, alkyl and alkoxy group.

3. A composition according to claim 1, wherein the accelerator is of the formula (structure with two Z-N-(CH₂CHO)ₘ₋₁-CH₂CHOH groups on a benzene ring with $R_1$, $R_2$ substituents)

wherein R, $m$ and Z are as defined in claim 1, and $R_1$ and $R_2$ are as defined in claim 2.

4. A composition according to claim 1, wherein the accelerator is of the formula (structure showing two aromatic rings bridged by X, each bearing Z-N-(CH₂CHO)ₘ₋₁-CH₂CHOH groups and $R_1$, $R_2$)

wherein R, $m$ and Z are as defined in claim 1, $R_1$ and $R_2$ are as defined in claim 2, X is selected from the group consisting of $$-CH_2-, -CO-, -S-, \text{ and } -SO_2-$$

and $y$ is an integer of at least 1 and at the most 2.

5. A composition according to claim 1, wherein the accelerator is of the formula (structure with multiple Z-N-(CH₂CHO)ₘ₋₁-CH₂CHOH groups on aromatic rings linked by CH₂ groups, with $R_1$ substituents and index $p$)

wherein $p$ is an integer of value at least 1, R, $m$ and Z are defined in claim 1, and $R_1$ is as defined in claim 2.

6. A composition according to claim 1, wherein the sum of the integers denoted by $m$ and $n$ does not exceed 10.

7. A composition according to claim 1, wherein the accelerator is of the formula $$HOCH_2CH_2-\left(OCH_2CH_2\right)_{r-1}-N-\left(CH_2CH_2O\right)_{s-1}-CH_2CH_2OH$$

(with a phenyl group attached to N)

wherein $r$ and $s$ are each an integer of at least 1 and at the most 2.

8. A composition as claimed in claim 7, wherein the accelerator is N,N-bis(2-hydroxyethyl)aniline.

9. A composition as claimed in claim 1, comprising 0.4 to 1.2 anhydride groups in the polycarboxylic acid hardener (2) per 1,2-epoxy group in the epoxide resin (1), and 1 to 10 parts of the accelerator (3) per 100 parts by weight of the epoxide resin (1).

References Cited

UNITED STATES PATENTS 3,052,650  9/1962  Wear et al. _____ 260—47

WILLIAM H. SHORT, *Primary Examiner.*

T. D. KERWIN, *Assistant Examiner.*